Patented Mar. 24, 1942

2,277,158

UNITED STATES PATENT OFFICE 2,277,158

INSECTICIDAL COMPOSITION

Wilfred Archibald Sexton, Blackley, Manchester, England, assignor to Imperial Chemical Industries Limited, a corporation of Great Britain No Drawing. Application May 2, 1940, Serial No. 333,033. In Great Britain April 14, 1939

3 Claims. (Cl. 167—22)

This invention relates to the manufacture of insecticidal compositions containing as toxic ingredients one or more N:N'-di-(1-cyanoalkyl)-substituted aliphatic or heterocyclic diamines in which the alkyls of the cyanoalkyl groups may be alike or different.

The said N:N'-di-(1-cyanoalkyl)-diamines may be made by interaction of one molecular proportion of a primary or secondary aliphatic or heterocylic diamine with two molecular proportions of hydrogen cyanide and two molecular proportions of a saturated aliphatic aldehyde or of a mixture of such aldehydes. Some such compounds are known, having been made by the method indicated, see, for instance, Berichte der deutschen chemischen Gesellschaft 1912, vol. 45, p. 1486; 1914, vol. 47, p. 2407. Others, hitherto unknown, may be made by the same method from other diamines and other saturated aliphatic aldehydes. In some cases it is advantageous to modify the details of the preparation. Thus, if desired, the interaction may be by stages. For instance the cyanhydrin of the aldehyde may first be made and subsequently caused to react with the diamine, or the diamine and the aldehyde may be first caused to interact to form a Schiff's base which is then caused to interact with hydrogen cyanide. Alternatively, if desired, derivatives of the aldehyde, for example, the bisulphite compound, may be caused to interact with the diamine and hydrogen cyanide. Also mixtures of aldehydes or mixtures of their derivatives may be used. In each case there is obtained one or more N:N'-di-(1-cyanoalkyl)-diamines.

According to the invention an insecticidal composition comprises one or more N:N'-di-(1-cyanoalkyl)-substituted aliphatic or heterocyclic diamines admixed with an inert pulverulent diluent or carrier such as talc, chalk, kieselguhr or bentonite, to which is added if desired a water-absorbent or dust-binding agent such as wool fat; or it comprises one or more such compounds, dissolved, suspended or emulsified in water or a suitable inert organic liquid, namely a chlorinated aliphatic hydrocarbon or a mineral or vegetable oil, or in an emulsion of such an organic liquid in water, to which may be added, before, during or after the operation of dissolution or dispersion, "stickers," "spreaders," wetting, penetrating or emulsifying agents.

The so-called "stickers" are substances such, for example, as glue or rosin soap, which are added to insecticidal compositions which are intended to be used as horticultural or agricultural sprays to assist the retention on the leaf surface of the active deposit which is left when the solvent or carrying fluid with which the composition has been made has drained or evaporated away.

"Spreaders" are substances such, for example, as conventional wetting or penetrating agents, which are similarly used to secure uniform and complete wetting of the leaf surface by the spray.

In carrying into practice that feature of the invention which relates to the making of a liquid preparation to be used as an insecticidal spray for horticultural or agricultural purposes, the active ingredient may conveniently be dissolved or dispersed in a large bulk of water or inert organic liquid with the aid (in the case of a dispersion) of a suitable quaternary ammonium salt, sulphonated oil or other dispersing agent, and with the addition, if desired, in either case of one or more auxiliary agents such as are described above. Alternatively a concentrated preparation which is more convenient for storage and transport may be made initially and this may be diluted with the carrying fluid shortly before use. Such a concentrated preparation may be a dispersion, a wettable powder, a true solution or a so-called "miscible oil" or "self-emulsifiable oil," which, although a clear and apparently homogenous liquid, is actually a colloidal solution.

As suitable N:N'-di-(1-cyanoalkyl)-substituted aliphatic or heterocyclic diamines there may be mentioned, for example, N:N'-di-(1-cyanoheptyl)-ethylene diamine, N:N'-di-(1-cyanoethyl)-ethylene diamine, N:N'-di-(1-cyanobutyl)-ethylene diamine, N:N'-di-(1-cyanobutyl)-hexamethylene diamine, N:N'-di-(1-cyanoheptyl)-hexamethylene diamine, N-(1-cyanobutyl)-N'-(1-cyanoheptyl)-ethylene diamine, N:N'-di-(1-cyanoheptyl)-N:N'-dimethyl-ethylene diamine, N:N'-di-(1-cyanoheptyl)-1:2-propylene diamine, N:N'-di-(1-cyanoethyl)-piperazine and N:N'-di-(1-cyanobutyl)-piperazine.

As suitable inert organic liquids for making the liquid insecticidal preparations, there may be mentioned, for example, hydrocarbons such as decolourised mineral oils or spindle oil, vegetable oils, for example, cottom seed oil or castor oil, and chlorinated aliphatic hydrocarbons such as trichloroethylene, tetrachloroethane or ethylene dichloride.

The invention is illustrated but not limited by the following examples, in which the parts are by weight.

*Example 1*

2.5 parts of N:N'-di-(1-cyanoheptyl)-ethylene diamine are dissolved in 97.5 parts of diodourised kerosene. The composition thus obtained is suitable for use as a fly spray.

*Example 2*

43 parts of an aqueous 70% solution of sulphonated oleic acid are mixed with 20 parts of N:N'-di-(1-cyanoheptyl)-ethylene diamine and 37 parts of β-ethoxyethanol. There is thus obtained a clear homogeneous oil which, when poured into water, forms stable emulsions.

1 part of this oil mixed with 800 parts of water yields an emulsion suitable for spraying on plants to control chrysanthemum aphis.

Example 3

36.6 parts of N:N'-di-(1-cyanoheptyl)-hexamethylene diamine are mixed with 29.3 parts of oleic acid and 24.4 parts of ethanol. 9.7 parts of ethanolamine are added and the mixture is stirred until it becomes a clear homogeneous oil.

1 part of this oil mixed with 730 parts of water forms a stable emulsion suitable for spraying on plants and highly toxic to aphids.

If, alternatively, 1 part of the oil is mixed with 7300 parts of water, there is obtained an emulsion which is highly toxic to the larvae of the yellow fever mosquito.

Example 4

24 parts of casein are gradually added to a boiling solution of 12 parts of borax in 360 parts of water. The liquid is boiled for a further 20 minutes and is then allowed to cool.

25 parts of N:N'-di-(1-cyanoheptyl)-ethylene diamine (or of N:N'-di-(1-cyanoheptyl)-1:2-propylene diamine) are dissolved in 36.5 parts of warm castor oil and 11.5 parts of trichloroethylene are added.

To this latter solution there are added 177 parts of the casein-borax solution described above and the mixture is vigorously stirred and then passed through a valve homogeniser. There is thus obtained a stable emulsion.

If 1 part of this emulsion is mixed with 400 parts of water, there is obtained a liquid suitable for use on plants as an aphicidal spray.

Example 5

1.2 parts of N:N'-di-(1-cyanoheptyl)-ethylene diamine are dissolved in 30 parts of spindle oil and the solution so obtained is added to a vigorously-stirred mixture of 13.8 parts of water and 5 parts of the emulsifying agent made as described in Example 1 of British Specification No. 323,720. There is thus obtained a coarse emulsion. This is passed through a valve homogeniser, whereby a stable emulsion is formed.

1 part of this emulsion mixed with 11 parts of water forms a liquid suitable for use as a "winter wash" or "dormant spray" on fruit trees.

Example 6

20 parts of N:N'-di-(1-cyanobutyl)-piperazine are thoroughly mixed with 80 parts of talc. When this composition is dusted on the foliage of plum trees it inhibits the feeding of the larvae of the winter moth.

I claim:

1. Insecticidal compositions comprising at least one member of the class consisting of N:N'-di-(1-cyanoalkyl)-substituted aliphatic and heterocyclic diamines and an inert carrier.

2. Aqueous insecticidal compositions comprising at least one member of the class consisting of N:N'-di-(1-cyanoalkyl)-substituted aliphatic and heterocyclic diamines.

3. Organic liquid insecticidal compositions comprising at least one member of the class consisting of N:N'-di-(1-cyanoalkyl)-substituted aliphatic and heterocyclic diamines.

WILFRED ARCHIBALD SEXTON.